United States Patent [19]

Okutani et al.

[11] Patent Number: 4,742,282
[45] Date of Patent: May 3, 1988

[54] BRAKE PULSE FORMING CIRCUIT FOR A VIDEO TAPE RECORDER

[75] Inventors: Ayumu Okutani, Nara; Yukinori Konushi, Katano, both of Japan

[73] Assignee: Sanyo Electric Co., Ltd., Osaka, Japan

[21] Appl. No.: 58,229
[22] PCT Filed: Oct. 13, 1986
[86] PCT No.: PCT/JP86/00522
§ 371 Date: May 20, 1987
§ 102(e) Date: May 20, 1987
[87] PCT Pub. No.: WO87/02501
PCT Pub. Date: Apr. 23, 1987

[30] Foreign Application Priority Data

Oct. 15, 1985 [JP] Japan .................. 60-157161[U]

[51] Int. Cl.$^4$ ............................................. H02P 3/10
[52] U.S. Cl. ...................... 318/374; 318/362
[58] Field of Search ............... 318/263, 268, 269, 362, 318/370, 373, 374, 375; 360/73, 74.1

[56] References Cited

U.S. PATENT DOCUMENTS 4,460,857  7/1984  Michaelis ..................... 318/375
4,549,120 10/1985  Banno et al. ................ 318/373 X
4,629,949 12/1986  Senso ........................... 318/374 X

FOREIGN PATENT DOCUMENTS 56-35687  4/1981  Japan .......................... 318/373
2081533  2/1982  United Kingdom ......... 318/269
2083304  3/1982  United Kingdom ......... 318/269

Primary Examiner—Bentsu Ro
Attorney, Agent, or Firm—Armstrong, Nikaido, Marmelstein & Kubovcik

[57] ABSTRACT

A brake pulse forming circuit determines the rotational direction of a capstan motor in each edge of signals FG1 and FG2, utilizing D type flip-flops (21, 22, 23 and 24) and an NOR gate (25). A brake pulse f having a longer pulse width supplied from an intermittent driving circuit (10) to brake the capstan motor in a reverse direction is terminated by an AND gate (27), simultaneously with reverse detection of the capstan motor, and is applied to a capstan motor driving circuit as a corrected brake pulse j having a proper pulse width. In addition, a motor drive signal g supplied from the intermittent driving circuit (10) is terminated by an OR gate (26), simultaneously with reverse detection of the capstan motor. However, an EX-OR gate (28) prevents the motor driving signal g from being terminated by erroneous determination of the rotational direction at the time of starting the capstan motor.

6 Claims, 4 Drawing Sheets

BRAKE PULSE FORMING CIRCUIT FOR A VIDEO TAPE RECORDER

FIELD OF THE INVENTION

The present invention relates to a brake pulse forming circuit and more particularly, to a circuit of forming a brake pulse for stopping a tape in a video tape recorder (VTR) which drives intermittently a tape to perform intermittent slow reproduction.

BACKGROUND OF THE INVENTION

Conventionally, intermittent slow reproduction has been performed in a helical scanning type VTR. The intermittent slow reproduction is achieved by driving intermittently a tape so that still reproduction and normal reproduction are repeated with a predetermined interval. In order to perform such intermittent slow reproduction, the VTR is generally provided with an intermittent driving circuit. Briefly stated, the intermittent driving circuit functions such that a tape is initiated in response to a normal head switching signal (RF switching pulse) to perform normal reproduction and the tape is stopped in response to a control signal reproduced at the time of tape traveling to perform still reproduction.

More specifically, when normal reproduction is performed, the intermittent driving circuit generates a start pulse in response to the head switching signal and applies the same to a capstan motor of direct drive so that the capstan motor is rapidly rotated. On the other hand, when still reproduction is performed, the intermittent drive circuit generates a brake pulse in response to the reproduced control signal and applies the same to the capstan motor so that the capstan motor is reversed to brake the tape. During a tape traveling period between the above described start pulse and the brake pulse, the speed of the capstan motor is controlled utilizing an FG (frequency generator) signal of the capstan motor as described below.

In the above described intermittent slow reproduction, the position where the tape is stopped in a still reproduction state is important. More specifically, in the still reproduction state, unless noise is forced to be included surely in a vertical branking period, noiseless intermittent slow reproduction can not be achieved. The position where the tape is stopped in the still reproduction state is largely affected by the pulse width of the brake pulse. More specifically, if the pulse width of the brake pulse is smaller than the proper value, the tape is stopped prior to the correct position, and if it is larger than the proper value, the tape traveling direction is reversed.

The conventional VTR has been adapted such that a two-phase FG signal is extracted from the capstan motor, reverse of the capstan motor is determined by the two-phase FG signal, and application of the brake pulse is stopped when reverse is detected. Such a conventional technique is disclosed in, for example, Japanese Patent Laying-Open Gazette No. 83367/1983; "Sharp Technical Journal", of Japanese Periodical, No. 29, 1984, pp. 125–129; "National Technical Report", Vol. 28, No. 3, Jun. 1982; and Japanese Patent Laying-Open Gazette No. 76984/1982.

FIG. 1 is a schematic block diagram showing a circuit for detecting reverse of the capstan motor used in the above described conventional intermittent driving circuit. Description is now made on the structure of the circuit shown in FIG. 1.

In FIG. 1, the periphery of a magnet 1 which rotates simultaneously with a capstan motor (not shown) is magnetized to a number of poles. In addition, magnetic reluctance elements 2 arranged with a predetermined spacing from each other are provided, whose outputs are supplied as FG signals out of phase with each other by 90° through amplifiers 3 and 4 and comparators 5 and 6 for waveform shaping. Of the FG signals, a signal FG1 is applied to a data input of a D type flip-flop 7 and a signal FG2 is applied to a clock input of the D type flip-flop 7. A Q output of the D type flip-flop 7 is supplied as a determination output of reverse of the capstan motor.

FIG. 2 is a waveform diagram for explaining operation of the circuit shown in FIG. 1.

Referring now to FIG. 2, description is made on operation of the circuit for detecting reverse of the capstan motor shown in FIG. 1. The D type flip-flop 7 latches a level of the signal FG1 applied to the data input at the rising edge of the signal FG2 applied to the clock input. Therefore, as seen from FIG. 2, when the capstan motor rotates in a forward direction, an H level of the signal FG1 is necessarily latched by the D type flip-flop 7 at the rising edge of the signal FG2 and is outputted as an output of determination of forward rotation. However, when the capstan motor is reversed by applying the brake pulse and an L level of the signal FG1 is latched at the rising edge of the signal FG2, the D type flip-flop 7 applies an output for informing reverse detection of the capstan motor. The intermittent driving circuit stops application of the brake pulse to the capstan motor in response to reverse detection of the capstan motor.

However, since in the above described conventional intermittent driving circuit, the level of the other FG signal (for example, the signal FG1) can be latched, that is, the rotational direction of the capstan motor can be detected only at the timing of one edge of one of two FG signals (for example, the rising edge of the singal FG2 in FIG. 2), the time required for obtaining the reverse detecting output after the capstan motor is actually reversed may be long, in which case the brake pulse with a proper pulse width is not liable to be obtained. Furthermore, in the conventional intermittent driving circuit, when the FG signal at the time of starting the capstan motor is unstable and noise is contained, the determination circuit shown in FIG. 1 erroneously operates, so that there may be a possibility of failure of tape initiation.

DISCLOSURE OF THE INVENTION

The present invention provides a brake pulse forming circuit for generating a brake pulse having a proper pulse width in which the time required for detecting reverse of the capstan motor after the capstan motor is actually reversed is short.

A brake pulse forming circuit according to the present invention forms the brake pulse having a corrected pulse width and applies the same to the capstan motor to brake the capstan motor in a reverse direction during tape traveling in a video tape recorder for driving intermittently a tape with a predetermined time interval, characterized by comprising means for supplying the capstan motor with a motor driving signal for driving the capstan motor, means for generating the brake pulse having a constant pulse width and applying the same to the capstan motor at the time of braking the capstan motor in the reverse direction, means for generating first and second FG signals out of phase with each other, associated with rotation of the capstan motor, first latch means for latching a level of the first FG signal at the rising edge of the second FG signal, second latch means for latching a level of the second FG signal at the rising edge of the first FG signal, third latch means for latching a level of an inverted signal of the first FG signal at the falling edge of the second FG signal, fourth latch means for latching a level of an inverted signal of the second FG signal at the falling edge of the first FG signal, a first gate for outputting a signal indicating reverse detection of the capstan motor in response to the outputs of the first, second, third and fourth latch means, a second gate for correcting a constant pulse width of the brake pulse so that the brake pulse may be terminated in response to the output of the first gate and a third gate for correcting the motor driving signal so that the motor driving signal may be terminated in response to the outputs of the first and second gates.

According to the preferred embodiment of the brake pulse forming circuit, the capstan motor is initiated by a start pulse responsive to a head switching signal, and the brake pulse generating means generates the brake pulse in response to a control signal reproduced at the time of tape traveling.

According to another preferred embodiment of the brake pulse forming circuit, the first, second, third and fourth latch means are achieved by D type flip-flops.

According to still another preferred embodiment of the brake pulse forming circuit, means for disabling the third gate during a period other than the brake pulse generating period is included.

According to yet still another preferred embodiment of the brake pulse forming circuit, means for driving the capstan motor in a forward direction only during a predetermined time period after termination of the corrected brake pulse is included.

As described in the foregoing, according to the present invention, since the rotational direction of the capstan motor is detected at each edge of the first and second FG signals, the capstan motor can be braked in a reverse direction utilizing the brake pulse having a corrected pulse width in which the time required for detecting reverse of the capstan motor after the capstan motor is actually reversed is short, so that the tape can be stopped in the proper position in a still reproduction state.

Furthermore, according to the present invention, the motor driving signal is not erroneously terminated due to noise of the FG signal at the time of starting the capstan motor, so that the tape does not fail in initiation.

Additionally, according to the present invention, since the tape is fed slightly in a forward direction after termination of the brake pulse, offset of the position where the tape is stopped due to reverse of the capstan motor can be compensated for.

BEST MODE FOR CARRYING OUT THE INVENTION

Figure 1:
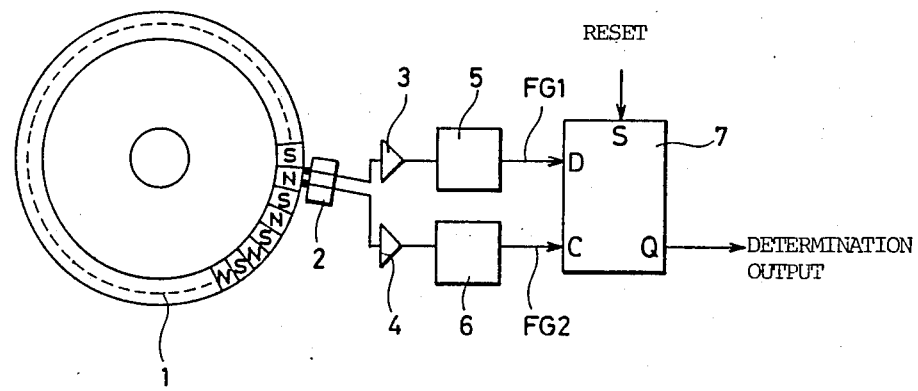
FIG. 1 is a schematic block diagram showing a circuit for detecting reverse of a capstan motor used in a conventional intermittent drive circuit.
Figure 2:
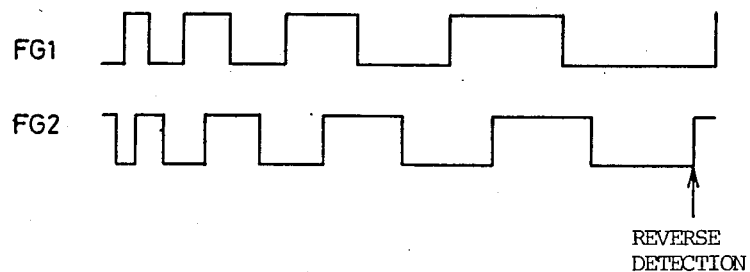
FIG. 2 is a waveform diagram for explaining operation of the circuit shown in FIG. 1
Figure 3:
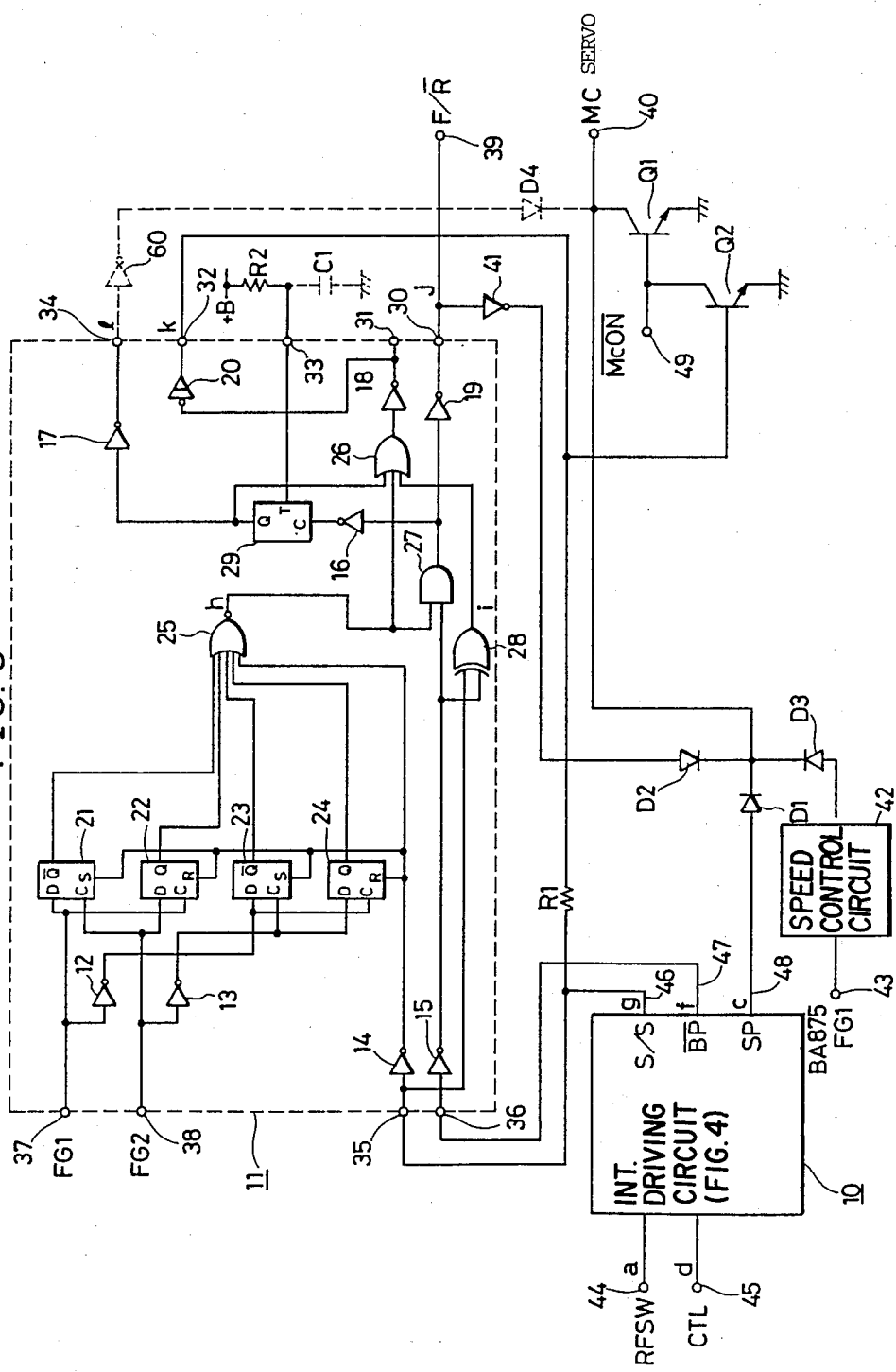
FIG. 3 is a circuit diagram of a brake pulse forming circuit according to an embodiment of the present invention.

FIG. 3 is a circuit diagram showing a brake pulse forming circuit according to an embodiment of the present invention.

Referring now to FIG. 3, description is made on a structure of a brake pulse forming circuit according to an embodiment of the present invention.

In FIG. 3, an intermittent driving circuit 10 is formed of an IC (BA875) and outputs a start pulse c through a terminal 48, outputs a brake pulse f through a terminal 47 and outputs a motor driving signal g through a terminal 46, in response to a head switching (RFSW) signal a applied through a terminal 44 and a reproduction control signal d applied through a terminal 45. In addition, the brake pulse f and the motor driving signal g are inputted to a capstan motor control signal correction circuit 11 through terminals 36 and 35, respectively. The capstan motor control signal correction circuit 11, which comprises a CMOS gate array, determines the rotational direction of a capstan motor in response to FG signals obtained from the capstan motor and outputs a corrected brake pulse j and a correction motor driving signal k. More specifically, a signal FG1 is inputted to the capstan motor control signal correction circuit 11 through a terminal 37 and a signal FG2 is inputted to the capstan motor control signal correction circuit 11 through a terminal 38. A first D type flip-flop 21 latches a level of the signal FG1 at the rising edge of the signal FG2 and outputs the inverted level. A second D type flip-flop 22 latches a level of the signal FG2 at the rising edge of the signal FG1 and outputs the same. A third D flip-flop 23 latches the inverted level of the signal FG1 through an inverter 12 at the falling edge of the signal FG2 and outputs the further inverted level. A fourth D type flip-flop 24 latches the inverted level of the signal FG2 through an inverter 13 at the falling edge of the signal FG1 and outputs the same. The D type flip-flops 21 and 23 are set at the rising edge of an output of an inverter 14 and the D type flip-flops 22 and 24 are reset at the rising edge of the output of the inverter 14. The respective outputs of the D type flip-flops 21, 22, 23 and 24 and the output of the inverter 14 are applied to an NOR gate 25 with five inputs. Furthermore, an output h of the NOR gate 25 and an output of an inverter 15 are inputted to an AND gate 27. An output of the AND gate 27 is inverted by an inverter 19 and then, the same is outputted as the corrected brake pulse j (negative logic) through an output terminal 30 and is applied to a forward/reverse direction indicating terminal (F/R̄) of a capstan motor driving circuit (not shown). In addition, the output of the AND gate 27 is applied to a C terminal of a monostable multivibrator 29 through an inverter 16. An output i of an EX-OR gate 28 receiving, as inputs, the motor driving signal g and the output of the inverter 15, an output of the monostable multivibrator 29 and the output h of the NOR gate 25 are applied to an OR gate 26 with three inputs. An output of the OR gate 26 is inverted by an inverter 18 and then, the same is outputted as a corrected motor driving signal through an output terminal 31. Furthermore, an output of the inverter 18 is inverted through an inverter 20 of an open drain type and then, the same is outputted as the corrected motor driving signal k through a terminal 32. Additionally, a time constant circuit for the monostable multivibrator 29 (a capacitor C1 and a resistor R2) may be connected to a terminal 33. The output of the monostable multivibrator 29 is inverted through an inverter 17 and then, the same is outputted as a forward direction feed pulse 1 through a terminal 34.

A speed control circuit 42 performs speed control of the capstan motor during a period between the start pulse c and the brake pulse f, in response to the signal FG1 inputted through a terminal 43. The start pulse c, the corrected brake pulse j inverted by an inverter 41 and an output of the speed control circuit 42 are applied to a capstan motor driving circuit (not shown) through a terminal 40 as the servo voltage, through diodes $D_1$, $D_2$ and $D_3$, respectively. In addition, a first transistor Q1, which is switching means for stopping supply of the above described servo voltage to the capstan motor drive circuit, is controlled by an $\overline{\text{McON}}$ signal applied from a system control circuit (not shown). A second transistor Q2, which is switching means for stopping application of the above described control signal $\overline{\text{McON}}$ to the transistor Q1, is controlled by the corrected motor driving signal k. Furthermore, since the inverter 20 is of an open drain type, the output k of the terminal 32 is connected to the terminal 46 of the intermittent driving circuit 10 through a resistor R1, so that it is pulled up equivalently.

Figure 4:
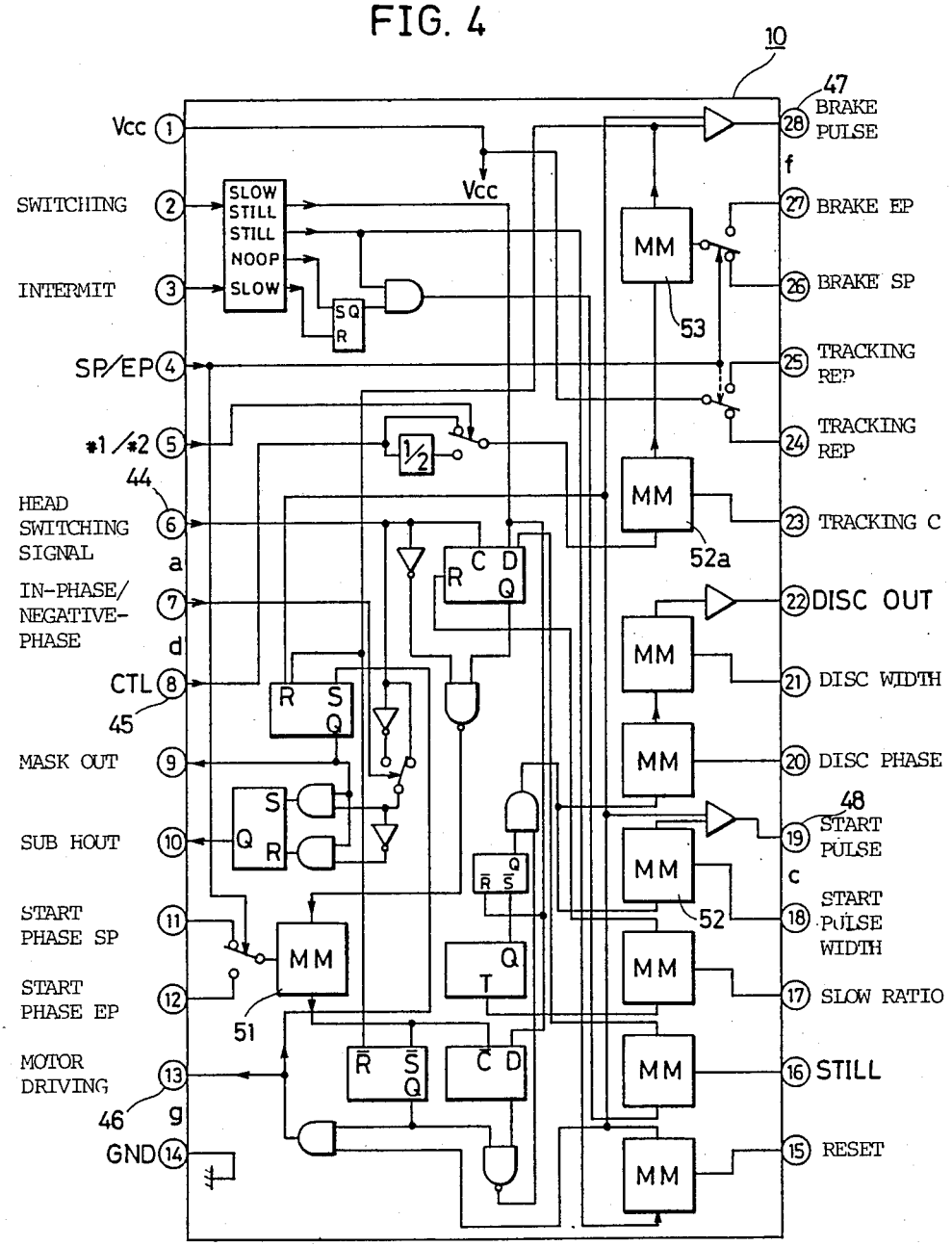
FIG. 4 is a circuit diagram showing an internal structure of the intermittent driving circuit shown in FIG. 3.
Figure 5:
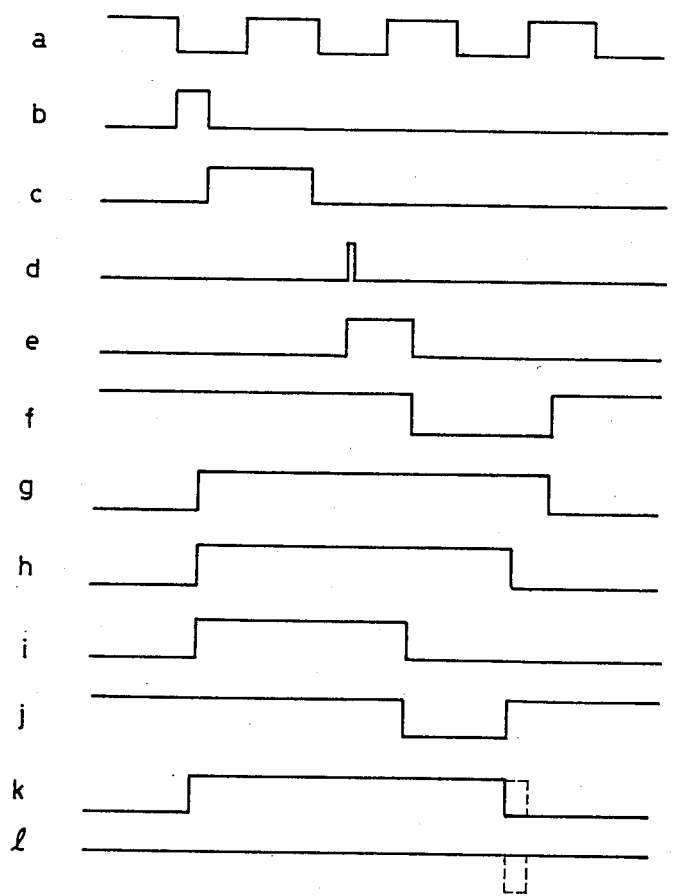
FIG. 5 is a waveform diagram for explaining operation of the circuit shown in FIGS. 3 and 4.
Figure 6:
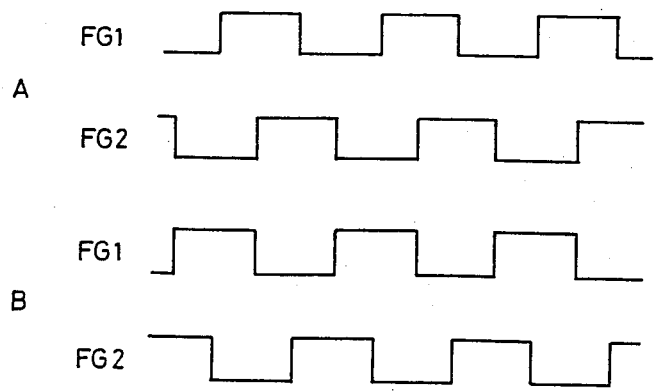
FIG. 6 is a waveform diagram showing the relation between signals FG1 and FG2 at the time of rotations of the capstan motor in forward and reverse directions.

FIG. 4 is an internal block diagram showing a structure of the intermittent driving circuit 10 shown in FIG. 3, and FIGS. 5 and 6 are waveform diagrams for explaining operation of the circuit shown in FIG. 3.

Referring now to FIGS. 3 to 6, description is made on operation according to an embodiment of the present invention.

Referring now to FIGS. 4 and 5, a start phase monostable multivibrator 51 within the intermittent driving circuit 10 is triggered at the falling edge of the head switching signal a applied to a terminal 44 and a start pulse monostable multivibrator 52 is triggered at the falling edge of an output b of the start phase monostable multivibrator 51, so that the start pulse c is generated at the terminal 48 and the motor driving signal g at an H level is outputted from the terminal 46.

FIG. 6A is a diagram showing the relation between the signals FG1 and FG2 at the time of rotation of the capstan motor in a forward direction, and FIG. 6B is a diagram showing the relation between the signals FGI and FG2 at the time of rotation of the capstan motor in a reverse direction. At the time of rotation of the capstan motor in a forward direction, all outputs of the D type flip-flops 21, 22, 23 and 24 become at an L level, as seen from FIG. 6A, and at the time of rotation of the capstan motor in a reverse direction, all the outputs of the D type flip-flops 21, 22, 23 and 24 become at an H level, as seen from FIG. 6B, since the D type flip-flops 21 and 23 utilize $\overline{Q}$ outputs and the D type flip-flops 22 and 24 utilize Q outputs. Furthermore, since the D type flip-flops 21 and 23 are set at the rising edge of the output of the inverter 14 and the D type flip-flops 22 and 24 are also reset at the rising edge of the output of the inverter 14, at the time of termination of the motor driving signal g, all the outputs of the D type flip-flops 21, 22, 23 and 24 are at the same L level as at the time of rotation in a forward direction. At that time, when the motor driving signal g becomes an H level at the terminal 46 of the intermittent driving circuit 10 as described above, the output of the inverter 14 becomes an L level, so that the output of the NOR gate 25 becomes an H level because all the outputs of the D type flip-flops 21, 22, 23 and 24 are at an L level. On the other hand, since the brake pulse f is an H level as shown in FIG. 5, the output of the EX-OR gate 28 rises to an H level, simultaneously with the rising of the motor driving signal g.

Therefore, the output of the OR gate 26 becomes an H level, simultaneously with the rising of the motor driving signal g, so that the second transistor Q2 is turned on. Thus, the $\overline{\text{McON}}$ signal which is an H level at the time of still reproduction and slow reproduction is not applied to a base electrode of the first transistor Q1, so that the first transistor Q1 is turned off. As a result, the start pulse c is supplied to the capstan motor driving circuit (not shown) from the terminal 48 of the intermittent driving circuit 10, so that the capstan motor begins to rotate in a forward direction.

After the capstan motor is thus initiated in a forward direction, all the determination outputs of the D type flip-flops 21, 22, 23 and 24 remain at an L level, as described above.

When the reproduction control signal d is reproduced as the tape travels, a tracking monostable multivibrator 52a within the intermittent driving circuit 10 is triggered and a brake pulse monostable multivibrator 53 is triggered at the falling edge of an output e of the tracking monostable multivibrator 52a, so that the brake pulse f of the negative logic as shown in FIG. 5 is outputted from the 28th pin, i.e., the terminal 47 of the IC 10. The motor driving signal g applied from the intermittent driving circuit 10 falls, simultaneously with termination of the brake pulse f. The time points of termination of the brake pulse f and the motor driving signal g supplied from the intermittent driving circuit 10 are set longer by selecting suitably a time constant externally appended to the IC 10.

When the brake pulse f is applied to the terminal 36 of the capstan motor control signal correction circuit 11, the output i of the EX-OR gate 28 becomes an L level, so that the output of the OR gate 26 changes in accordance with change in the output of the NOR gate 25. At that time, a time constant circuit is not connected to the monostable multivibrator 29, so that it can be ignored. Since the output of the NOR gate 25 is an H level, the AND gate 27 is opened, so that the output j from the terminal 30 falls to an L level, simultaneously with the brake pulse f. Therefore, a reverse brake is provided to the capstan motor through the forward/reverse direction indicating terminal $\overline{F/R}$ of the capstan motor driving circuit, so that the tape traveling speed is decreased.

When the rotational speed of the capstan motor is decreased and finally is in a reverse rotation state, at least one output of the D type flip-flops 21, 22, 23 and 24 becomes an H level and the output of the NOR gate 25 becomes an L level, so that reverse rotation of the capstan motor is detected. As a result, the AND gate 27 is closed, so that the corrected brake pulse j from the terminal 30 is terminated and at the same time, the corrected motor driving signal k from the terminal 32 is terminated.

More specifically, the time points of termination of the brake pulse f and the motor driving signal g supplied from the intermittent driving circuit 10 are set longer, as described above. However, since the corrected brake pulse j is terminated at the time point when reverse rotation of the capstan motor is detected by the D type flip-flops 21, 22, 23 and 24, the tape is stopped in a correct position, so that good still reproduction can be achieved.

Furthermore, the output i of the EX-OR gate 28, which becomes an L level during at least a period when the brake pulse is applied, is applied to the OR gate 26, in order to prevent the corrected motor driving signal k from being erroneously an L level by erroneous determination of the rotational direction by the D type flip-flops 21, 22, 23 and 24 due to noise contained in the FG signal at the time of starting the capstan motor so that initiation of the tape may be ensured.

Additionally, the tape traveling may not be stopped immediately after termination of the corrected brake pulse j so that the reverse state is continued for some time, depending on the capstan motor and the tape traveling system utilized. For such a case, the monostable multivibrator 29 is provided. When a capacitor C1 represented by the broken line in FIG. 3 is connected to the terminal 33 to form a time constant circuit, the monostable multivibrator 29 triggered by the output of the AND gate 27 applies an output at an H level over a predetermined time period. As represented by the broken line in FIG. 5, if and when the forward direction feed pulse 1, which is the inverted output of the monostable multivibrator 29 inverted by the inverter 17, is further inverted by an inverter 60 and is applied to the servo voltage, the tape is fed slightly in a forward direction after termination of the corrected brake pulse j. During this period, the corrected motor driving signal k is extended over the period represented by the broken line.

When the driving capacity of the output terminal 32 of an open drain is insufficient, the terminal 31 can be utilized with a transistor externally connected thereto.

INDUSTRIAL APPLICABILITY

The present invention can be broadly applied to a video tape recorder which performs intermittent slow reproduction by driving intermittently a tape to repeat still reproduction and normal reproduction in a predetermined interval.

What is claimed:

1. In a video tape recorder having a capstan motor for intermittently driving a tape with a predetermined time interval, a brake pulse forming circuit for forming a brake pulse having a corrected pulse width and applying the same to said capstan motor to brake the capstan motor in a reverse direction during tape traveling, comprising:

means for supplying said capstan motor with a motor driving signal for driving said capstan motor, means for generating a brake pulse having a constant pulse width and applying the same to said capstan motor at the time of braking said capstan motor in a reverse direction, means for generating first and second FG signals, out of phase with each other, associated with rotation of said capstan motor, first latch means for latching a level of said first FG signal at the rising edge of said second FG signal, second latch means for latching a level of said second FG signal at the rising edge of said first FG signal, third latch means for latching a level of an inverted signal of said first FG signal at the falling edge of said second FG signal, fourth latch means for latching a level of an inverted signal of said second FG signal at the falling edge of said first FG signal, a first gate for outputting a signal indicating reverse detection of said capstan motor in response to the outputs of said first, second, third and fourth latch means, a second gate for correcting a constant pulse width of said brake pulse so that said brake pulse may be terminated in response to the output of said first gate, and a third gate for correcting said motor driving signal so that said motor driving signal may be terminated in response to the output of said first gate.

2. The video tape, recorder in accordance with claim 1, wherein
said capstan motor is initiated by a start pulse responsive to a head switching signal.

3. The video tape recorder pulse in accordance with claim 1, wherein
said brake pulse generating means generates said brake pulse in response to a control signal reproduced at the time of tape traveling.

4. The video tape recorder in accordance with claim 1, wherein
said first, second, third and fourth latch means are D type flip-flops.

5.The vidio tape recoder circuit in accordance with claim 1, further comprising:
means for said third gate during a period other than the brake pulse generating period.

6. The video tape recorder in accordance with claim 1, further comprising:
means for driving said capstan motor in a forward direction only during a predetermined time period, after termination of said corrected brake pulse.

* * * * *